US012736016B2

(12) United States Patent
Yamaguchi et al.

(10) Patent No.: US 12,736,016 B2
(45) Date of Patent: Sep. 15, 2026

(54) INTERNAL COMBUSTION ENGINE SYSTEM

(71) Applicant: TOYOTA JIDOSHA KABUSHIKI KAISHA, Toyota (JP)

(72) Inventors: Yuji Yamaguchi, Gotemba (JP); Taisuke Yoshida, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/302,524

(22) Filed: Aug. 18, 2025

(65) Prior Publication Data

US 2026/0117720 A1 Apr. 30, 2026

(30) Foreign Application Priority Data

Oct. 28, 2024 (JP) ................................ 2024-189074

(51) Int. Cl.
*F02D 41/14* (2006.01)
*F01N 11/00* (2006.01)
(Continued)

(52) U.S. Cl.
CPC ........ *F02D 41/1454* (2013.01); *F01N 11/002* (2013.01); *F01N 11/007* (2013.01);
(Continued)

(58) Field of Classification Search
CPC .. F01N 11/002; F01N 11/007; F01N 13/0093; F01N 2340/06; F01N 2430/06; F01N 2560/02; F01N 2560/025; F01N 2560/07; F01N 2900/04; F01N 2900/0408; F01N 2900/0411; F01N 2900/0416;
(Continued)

(56) References Cited

U.S. PATENT DOCUMENTS

2003/0017603 A1* 1/2003 Uchida .................. F02D 41/22 436/127
2005/0262828 A1* 12/2005 Iihoshi ................ F02D 41/1443 60/285

(Continued)

FOREIGN PATENT DOCUMENTS

JP 2016-031038 A 3/2016
WO 2016/017154 A1 2/2016

*Primary Examiner* — Binh Q Tran
(74) *Attorney, Agent, or Firm* — SoraIP, Inc.

(57) ABSTRACT

An internal combustion engine system is configured to execute feedback processing of performing feedback control of an air-fuel ratio such that exhaust gas exhausted from an internal combustion engine reaches a target air-fuel ratio, target air-fuel ratio switching processing of alternately switching the target air-fuel ratio between lean and rich setting values, parameter calculation processing of calculating a gas impingement parameter indicating a degree of gas impingement to which unclean gas in the exhaust gas exhausted from a first exhaust gas cleaning catalyst impinges on a second air-fuel ratio sensor downstream of the first exhaust gas cleaning catalyst, based on an operating condition of the internal combustion engine, and switching cycle change processing of lengthening a switching cycle of the target air-fuel ratio in the target air-fuel ratio switching processing as the gas impingement parameter is a value indicating that the degree of gas impingement is high.

4 Claims, 5 Drawing Sheets

(51) Int. Cl.

| | |
|---|---|
| ***F01N 13/00*** | (2010.01) |
| ***F02B 37/18*** | (2006.01) |
| ***F02D 41/02*** | (2006.01) |
| ***F02D 41/18*** | (2006.01) |

(52) U.S. Cl.
CPC .......... *F01N 13/0093* (2014.06); *F02B 37/18* (2013.01); *F02D 41/0235* (2013.01); *F02D 41/0275* (2013.01); *F02D 41/1441* (2013.01); *F02D 41/182* (2013.01); *F01N 2430/06* (2013.01); *F01N 2560/025* (2013.01); *F01N 2560/07* (2013.01); *F01N 2900/0408* (2013.01); *F01N 2900/0416* (2013.01); *F01N 2900/1411* (2013.01); *F02D 2200/04* (2013.01); *F02D 2200/101* (2013.01)

(58) Field of Classification Search
CPC ..... F01N 2900/1402; F01N 2900/1411; F02D 41/1454; F02D 41/0235; F02D 41/0275; F02D 41/1441; F02D 41/182; F02D 2200/04; F02D 2200/101
See application file for complete search history.

(56) References Cited

U.S. PATENT DOCUMENTS

| | | | | |
|---|---|---|---|---|
| 2013/0018568 A1* | 1/2013 | Takada | F02D 41/1456 | 701/103 |
| 2013/0192211 A1* | 8/2013 | Nakano | F02D 41/1441 | 60/276 |
| 2015/0025778 A1* | 1/2015 | Matsuoka | G01N 27/4065 | 701/104 |
| 2016/0319750 A1* | 11/2016 | Kayanuma | F02B 75/10 | |
| 2020/0182116 A1* | 6/2020 | Umezawa | F02D 41/1456 | |
| 2021/0404368 A1* | 12/2021 | Nakagawa | F01N 11/007 | |

* cited by examiner

INTERNAL COMBUSTION ENGINE SYSTEM

CROSS-REFERENCE TO RELATED APPLICATION

This application claims priority to Japanese Patent Application No. 2024-189074 filed on Oct. 28, 2024. The disclosure of the above-identified application, including the specification, drawings, and claims, is incorporated by reference herein in its entirety.

BACKGROUND

1. Technical Field

The present disclosure relates to an internal combustion engine system, and particularly to an internal combustion engine system that cleans exhaust gas exhausted from an internal combustion engine using an exhaust gas cleaning catalyst.

2. Description of Related Art

Japanese Unexamined Patent Application Publication No. 2016-31038 (JP 2016-31038 A) discloses a technology related to a control device for suppressing an outflow of NOx and uncombusted gas from an exhaust gas cleaning catalyst. An internal combustion engine of the technology is provided with the exhaust gas cleaning catalyst, a downstream air-fuel ratio sensor disposed downstream of the exhaust gas cleaning catalyst, and an air flow meter that detects an intake-air amount. The control device performs feedback control such that an exhaust air-fuel ratio of the internal combustion engine reaches a target air-fuel ratio. The control device sets the target air-fuel ratio to a lean air-fuel ratio in a case where an output air-fuel ratio of the downstream air-fuel ratio sensor reaches a rich air-fuel ratio. The control device sets the target air-fuel ratio to the rich air-fuel ratio in a case where the output air-fuel ratio of the downstream air-fuel ratio sensor reaches the lean air-fuel ratio.

SUMMARY

Exhaust gas exhausted downstream of the exhaust gas cleaning catalyst may change, depending on an operation state of the internal combustion engine, in a ratio between clean gas that is sufficiently cleaned and unclean gas that is not sufficiently cleaned and their distributions within a pipe. For this reason, gas impingement of the unclean gas on the downstream air-fuel ratio sensor installed downstream of the exhaust gas cleaning catalyst also changes depending on the operation state of the internal combustion engine. As in the technology of JP 2016-31038 A, a timing at which the target air-fuel ratio is changed may be determined based on a detection value of the downstream air-fuel ratio sensor without considering the change in the gas impingement. In this case, a cleaning limit state of the exhaust gas cleaning catalyst is erroneously detected, and there is a concern that a cleaning capability of the exhaust gas cleaning catalyst is not sufficiently utilized.

The present disclosure has been devised in view of the above-described problems, and an object thereof is to provide an internal combustion engine system that can effectively utilize a cleaning capability of an exhaust gas cleaning catalyst by considering an influence of gas impingement of unclean gas on an air-fuel ratio sensor.

In order to solve the above-described problems, the present disclosure provides an internal combustion engine system. The internal combustion engine system includes:

- a first exhaust gas cleaning catalyst disposed in an exhaust passage of an internal combustion engine;
- a second exhaust gas cleaning catalyst disposed downstream of the first exhaust gas cleaning catalyst in an exhaust gas flow direction;
- a first air-fuel ratio sensor disposed upstream of the first exhaust gas cleaning catalyst in the exhaust gas flow direction in the exhaust passage;
- a second air-fuel ratio sensor disposed downstream of the first exhaust gas cleaning catalyst in the exhaust gas flow direction and upstream of the second exhaust gas cleaning catalyst in the exhaust gas flow direction in the exhaust passage; and
- a control device configured to control the internal combustion engine.

The control device is configured to execute

- feedback processing of performing feedback control of an air-fuel ratio of exhaust gas exhausted from the internal combustion engine such that a first air-fuel ratio detected by the first air-fuel ratio sensor reaches a target air-fuel ratio,
- target air-fuel ratio switching processing of alternately switching the target air-fuel ratio between a lean setting value leaner than a stoichiometric air-fuel ratio and a rich setting value richer than the stoichiometric air-fuel ratio,
- parameter calculation processing of calculating, based on an operating condition of the internal combustion engine, a gas impingement parameter indicating a degree of gas impingement to which unclean gas in the exhaust gas exhausted from the first exhaust gas cleaning catalyst impinges on the second air-fuel ratio sensor, and
- switching cycle change processing of lengthening a switching cycle of the target air-fuel ratio in the target air-fuel ratio switching processing as the gas impingement parameter is a value indicating that the degree of gas impingement is high.

In the target air-fuel ratio switching processing of the present disclosure, the control device may be configured to set the target air-fuel ratio to the lean setting value when a second air-fuel ratio detected by the second air-fuel ratio sensor is equal to or less than a rich determination value richer than the stoichiometric air-fuel ratio, and the control device may be configured to set the target air-fuel ratio to the rich setting value when the second air-fuel ratio is equal to or more than a lean determination value leaner than the stoichiometric air-fuel ratio.

In the switching cycle change processing, the control device may be configured to set the lean determination value and the rich determination value to values farther from the stoichiometric air-fuel ratio as the gas impingement parameter is the value indicating that the degree of gas impingement is high.

In addition, when the internal combustion engine of the present disclosure is an internal combustion engine with a turbocharger including a wastegate port and a wastegate valve that opens and closes the wastegate port, in the parameter calculation processing of the present disclosure, the control device may be configured to calculate the gas impingement parameter based on a rotation speed and an intake-air amount of the internal combustion engine and an opening degree of the wastegate valve.

With the internal combustion engine system of the present disclosure, it is possible to effectively utilize the cleaning capability of the exhaust gas cleaning catalyst by considering the influence of the gas impingement of the unclean gas on the air-fuel ratio sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described. However, in a case where the present disclosure is mentioned as the number such as the number, the quantity, the amount, the range, or the like of each element in the embodiments shown below, the present disclosure is not limited to the mentioned number unless specified otherwise or clearly identified with that number in principle. In addition, the structures, steps, and the like described in the embodiments shown below are not necessarily needed to the present disclosure unless otherwise specified or clearly identified in principle.

EMBODIMENT

1. Configuration of Embodiment

Figure 1:
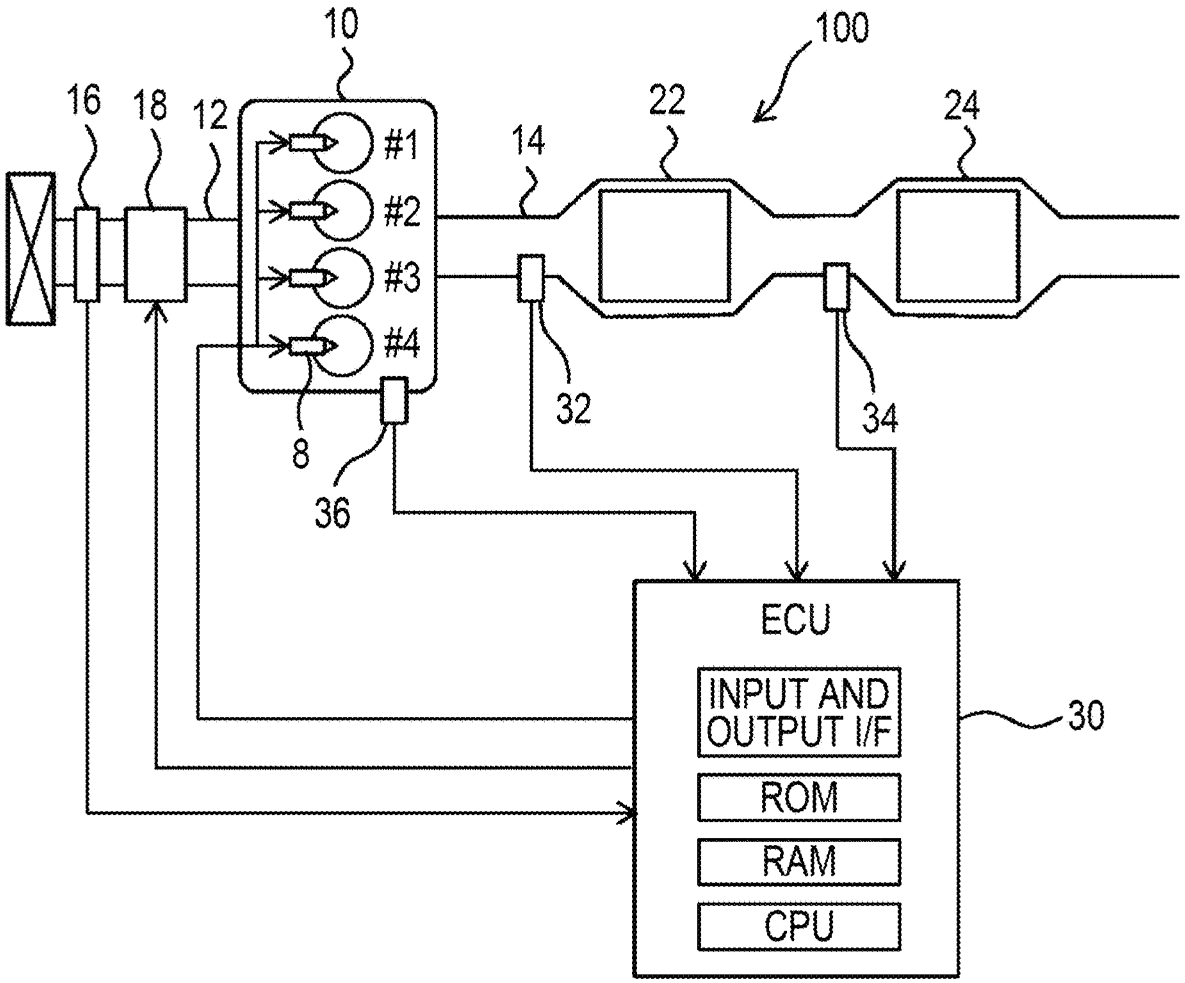
FIG. 1 is a diagram for describing a configuration of an internal combustion engine system of an embodiment.

FIG. 1 is a diagram for describing a configuration of an internal combustion engine system of an embodiment. As shown in FIG. 1, an internal combustion engine system 100 of the present embodiment includes an internal combustion engine (engine) 10 including a plurality of cylinders. The engine 10 is mounted on a vehicle as a power source. The engine 10 is a gasoline engine that is based on stoichiometric combustion using a stoichiometric air-fuel ratio. The engine 10 includes four cylinders in series, and an injector 8 is provided for each cylinder. An intake manifold and an exhaust manifold are attached to the engine 10 (both are not shown). An intake passage 12 for taking in intake air to the engine 10 is connected to the intake manifold. An exhaust passage 14 for releasing exhaust gas discharged from the engine 10 to the atmosphere is connected to the exhaust manifold.

An air flow meter 16 for detecting an intake-air amount Ga is disposed in the middle of the intake passage 12. A throttle valve 18 is provided downstream of the air flow meter 16 in an intake air flow direction in the intake passage 12. A first exhaust gas cleaning catalyst 22 is disposed in the exhaust passage 14. A second exhaust gas cleaning catalyst 24 is disposed downstream of the first exhaust gas cleaning catalyst 22 in an exhaust gas flow direction in the exhaust passage 14.

For example, both the first exhaust gas cleaning catalyst 22 and the second exhaust gas cleaning catalyst 24 have the same configuration. The first exhaust gas cleaning catalyst 22 and the second exhaust gas cleaning catalyst 24 are three-way catalysts having an oxygen storage capacity. Specifically, the first exhaust gas cleaning catalyst 22 and the second exhaust gas cleaning catalyst 24 are catalysts in which a noble metal such as platinum (Pt) having a catalytic action, and ceria ($CeO_2$) or the like having an oxygen storage capacity are supported on a base material made of ceramic. In a case where a predetermined activation temperature is reached, the first exhaust gas cleaning catalyst 22 and the second exhaust gas cleaning catalyst 24 exhibit a catalytic action of simultaneously removing uncombusted gas (HC, CO, and the like) and nitrogen oxide (NOx), and the oxygen storage capacity of storing oxygen.

With the oxygen storage capacity of the first exhaust gas cleaning catalyst 22 and the second exhaust gas cleaning catalyst 24, in a case where the air-fuel ratio of the exhaust gas flowing into the first exhaust gas cleaning catalyst 22 and the second exhaust gas cleaning catalyst 24 is a lean air-fuel ratio that is leaner than the stoichiometric air-fuel ratio, oxygen in the exhaust gas is stored. On the other hand, in a case where the air-fuel ratio of the exhaust gas flowing into the first exhaust gas cleaning catalyst 22 and the second exhaust gas cleaning catalyst 24 is a rich air-fuel ratio that is richer than the stoichiometric air-fuel ratio, the first exhaust gas cleaning catalyst 22 and the second exhaust gas cleaning catalyst 24 release the oxygen stored in the first exhaust gas cleaning catalyst 22 and the second exhaust gas cleaning catalyst 24. The types and structures of the first exhaust gas cleaning catalyst 22 and the second exhaust gas cleaning catalyst 24 are not limited as long as the first exhaust gas cleaning catalyst 22 and the second exhaust gas cleaning catalyst 24 have a catalytic action of cleaning the exhaust gas and the oxygen storage capacity.

The internal combustion engine system 100 according to the present embodiment includes an electronic control unit (ECU) 30. The ECU 30 is a control device that integrally controls the entire internal combustion engine system 100. The control device according to the present disclosure is realized as one function of the ECU 30.

The ECU 30 includes at least an input and output interface, a ROM, a RAM, and a central processing unit (CPU). The input and output interface takes in signals of sensors included in the internal combustion engine system 100 and outputs operation signals to actuators included in the engine 10. The sensors are attached to respective locations of the internal combustion engine system 100. A first air-fuel ratio sensor 32 is provided upstream of the first exhaust gas cleaning catalyst 22 in the exhaust passage 14. The first air-fuel ratio sensor 32 detects an air-fuel ratio of exhaust gas exhausted from the engine 10 to the exhaust passage 14 as a first air-fuel ratio. A second air-fuel ratio sensor 34 is provided downstream of the first exhaust gas cleaning catalyst 22 in the exhaust gas flow direction and upstream of the second exhaust gas cleaning catalyst 24 in the exhaust gas flow direction in the exhaust passage 14. The second air-fuel ratio sensor 34 detects an air-fuel ratio of exhaust gas that flows out from the first exhaust gas cleaning catalyst 22 and flows into the second exhaust gas cleaning catalyst 24, as a second air-fuel ratio. Further, a rotation speed sensor 36 that detects an engine rotation speed NE of the engine 10, and various sensors for detecting a state of the engine 10 are also attached. The ECU 30 processes each taken-in signal of the sensors and operates each actuator according to a predetermined control program.

The actuators operated by the ECU 30 include the injector 8, the throttle valve 18, and the like. The ROM stores various types of control data including various control programs and maps for controlling the engine 10. The CPU reads out the control program from the ROM and executes the control program and generates an operation signal based on the taken-in sensor signal. Although there are a large number of actuators and sensors connected to the ECU 30 in addition to those shown in the drawing, description thereof will be omitted in the present specification.

Figure 2:
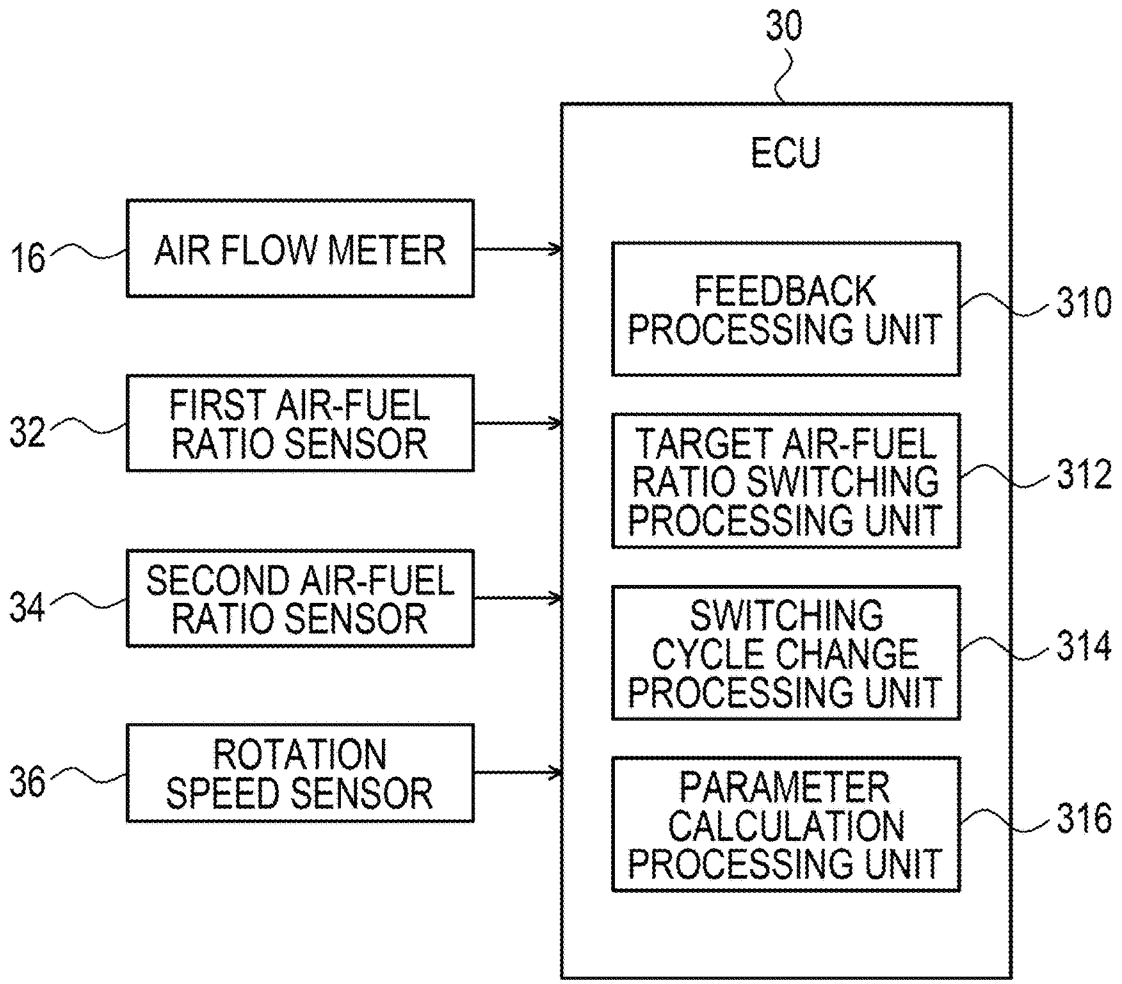
FIG. 2 is a diagram showing a functional block of an ECU.

FIG. 2 is a diagram showing a functional block of the ECU. The ECU 30 includes a feedback processing unit 310, a target air-fuel ratio switching processing unit 312, a switching cycle change processing unit 314, and a parameter calculation processing unit 316, as functional blocks for controlling the internal combustion engine system 100. Hereinafter, processing executed in each functional block will be described in detail.

2. Basic Operation of Internal Combustion Engine System of Embodiment

2-1. Feedback Processing

The control of the engine 10 executed by the ECU 30 of the internal combustion engine system 100 includes feedback processing. The feedback processing is executed by the feedback processing unit 310 of the ECU 30. In the feedback processing of the present embodiment, a fuel injection amount from the injector 8 is subjected to feedback control such that the first air-fuel ratio detected by the first air-fuel ratio sensor 32 corresponds to the target air-fuel ratio. The target air-fuel ratio here is, for example, the stoichiometric air-fuel ratio (A/F 14.60).

2-2. Target Air-Fuel Ratio Switching Processing

The control of the engine 10 executed by the ECU 30 of the internal combustion engine system 100 includes target air-fuel ratio switching processing. The target air-fuel ratio switching processing is executed by the target air-fuel ratio switching processing unit 312 of the ECU 30. In the target air-fuel ratio switching processing of the present embodiment, the target air-fuel ratio is alternately switched between the lean setting value leaner than the stoichiometric air-fuel ratio and the rich setting value richer than the stoichiometric air-fuel ratio. Specifically, in the target air-fuel ratio switching processing, the target air-fuel ratio is set to the lean setting value in a case where the second air-fuel ratio detected by the second air-fuel ratio sensor 34 is equal to or less than the rich determination value richer than the stoichiometric air-fuel ratio. In addition, the target air-fuel ratio is configured to be set to the rich setting value in a case where the second air-fuel ratio is equal to or more than the lean determination value leaner than the stoichiometric air-fuel ratio.

In a case where the exhaust gas cleaning catalyst capable of storing oxygen maintains an internal oxygen storage amount almost constant, the oxygen storage capacity decreases. Therefore, in order to maintain the oxygen storage capacity as much as possible, it is preferable to alternately change the internal oxygen storage amount between a storage amount close to zero and a storage amount close to the maximum during use of the exhaust gas cleaning catalyst. With the target air-fuel ratio switching processing according to the present embodiment, the target air-fuel ratio is alternately switched between the lean setting value and the rich setting value. Therefore, the oxygen storage amounts of the first exhaust gas cleaning catalyst 22 and the second exhaust gas cleaning catalyst 24 are repeatedly increased and decreased. Accordingly, since the oxygen storage amounts of the first exhaust gas cleaning catalyst 22 and the second exhaust gas cleaning catalyst 24 can be maintained as high as possible, a degree of effective utilization of the first exhaust gas cleaning catalyst 22 and the second exhaust gas cleaning catalyst 24 is improved.

3. Feature Operation of Internal Combustion Engine System of Embodiment

3-1. Switching Cycle Change Processing

The control of the engine 10 executed by the ECU 30 of the internal combustion engine system 100 includes switching cycle change processing. The switching cycle change processing is executed by the switching cycle change processing unit 314 of the ECU 30.

As an example in a case where the engine 10 is a four-cylinder naturally aspirated engine, a case in which the engine rotation speed NE and the engine load KL change and a state in which a gas flow velocity of a #1 cylinder is high and the gas impingement of the #1 cylinder onto the second air-fuel ratio sensor 34 is strong is caused is considered. In this case, in a case where the target air-fuel ratio is set to the rich setting value in the target air-fuel ratio switching processing, the gas may flow out downstream in the flow direction of the first exhaust gas cleaning catalyst 22 as the insufficiently cleaned gas. This is because the gas of the #1 cylinder has a short time to sufficiently react in the first exhaust gas cleaning catalyst 22. As a result, in a case where the second air-fuel ratio sensor 34 detects the rich air-fuel ratio, the first exhaust gas cleaning catalyst 22 is erroneously determined to have undergone a rich breakdown, and in the target air-fuel ratio switching processing, the target air-fuel ratio is changed to the lean setting value. As a result, a degree of effective utilization of the first exhaust gas cleaning catalyst 22 and the second exhaust gas cleaning catalyst 24 decreases.

As another example, in a case where the engine 10 is a multi-cylinder engine having a turbocharger, the gas passing through the wastegate port has a higher gas flow velocity than the gas passing through the turbine. Therefore, depending on the engine operating condition, a ratio between the gas passing through the turbine and the gas passing through the wastegate port changes, and the impingement of the gas passing through the wastegate port on the second air-fuel ratio sensor 34 may be strong. In this case, there is a concern that the degree of effective utilization of the first exhaust gas cleaning catalyst 22 and the second exhaust gas cleaning catalyst 24 decreases as in the above-described example.

Figure 3:
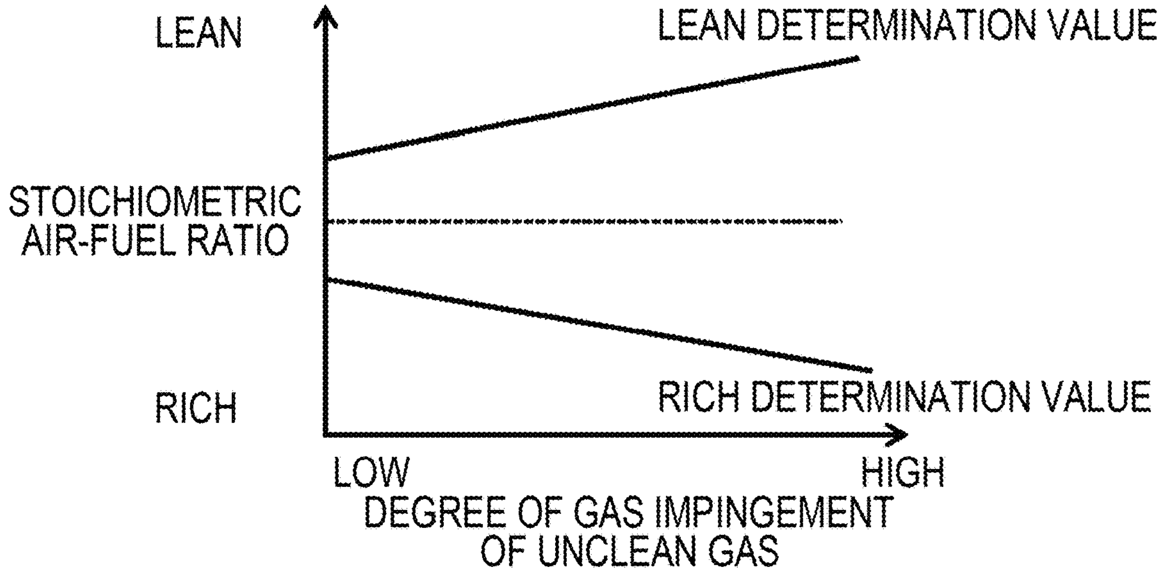
FIG. 3 is a diagram showing an example of a map in which setting values of a rich determination value and a lean determination value for a degree of gas impingement of unclean gas are defined.

Therefore, in the switching cycle change processing of the internal combustion engine system 100 of the embodiment, the higher the degree of gas impingement to which insufficiently cleaned unclean gas in the exhaust gas exhausted from the first exhaust gas cleaning catalyst 22 impinges on the second air-fuel ratio sensor 34, the longer the switching cycle of the target air-fuel ratio in the target air-fuel ratio switching processing. The switching cycle of the target air-fuel ratio in the target air-fuel ratio switching processing can be adjusted based on settings of the rich determination value and the lean determination value used in the target air-fuel ratio switching processing. FIG. 3 is a diagram showing an example of a map in which setting values of the rich determination value and the lean determination value for the degree of gas impingement of the unclean gas are defined. In the map shown in FIG. 3, the rich determination value and the lean determination value used in the target air-fuel ratio switching processing are defined to correspond to the gas impingement parameter obtained by quantifying the degree of gas impingement to which the unclean gas impinges on the second air-fuel ratio sensor 34. The ECU 30 stores the map shown in FIG. 3 in the ROM. The switching cycle change processing unit 314 reads out, for example, the map shown in FIG. 3 from the ROM and specifies the rich determination value and the lean determination value corresponding to the gas impingement parameter. With the map shown in FIG. 3, as the gas impingement parameter is a value indicating that the degree of gas impingement is high, the rich determination value and the lean determination value used in the target air-fuel ratio switching processing are set to values farther from the stoichiometric air-fuel ratio. Accordingly, as the gas impingement parameter is a value indicating that the degree of gas impingement is high, the switching cycle of the target air-fuel ratio in the target air-fuel ratio switching processing is lengthened.

3-2. Parameter Calculation Processing

The control of the engine 10 executed by the ECU 30 of the internal combustion engine system 100 includes parameter calculation processing. The parameter calculation processing is executed by the parameter calculation processing unit 316 of the ECU 30. In the parameter calculation processing of the present embodiment, the gas impingement parameter used in the switching cycle change processing is calculated based on the operating condition of the engine 10. In the calculation of the gas impingement parameter, the engine rotation speed NE detected by the rotation speed sensor 36 and the engine load KL calculated based on the engine rotation speed NE and the intake-air amount Ga detected by the air flow meter 16 are used as the operating condition of the engine 10. The ECU 30 stores a parameter calculation map in which a relationship between the engine rotation speed NE and the engine load KL and the gas impingement parameter is defined in the ROM. In the parameter calculation processing, the gas impingement parameter corresponding to the detected engine rotation speed NE and the detected engine load KL is specified from the parameter calculation map.

4. Specific Processing Executed in Internal Combustion Engine System of Embodiment Next, specific processing of a routine executed by the ECU 30 during the operation of the engine 10 will be described with reference to the flowchart.

Figure 4:
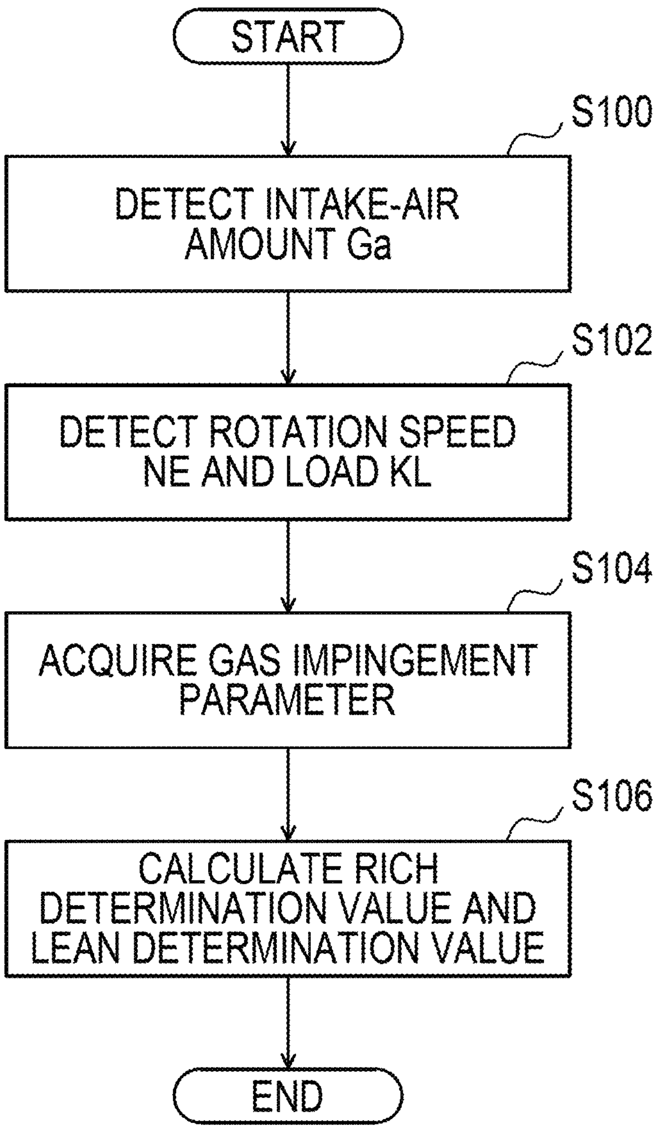
FIG. 4 is a flowchart showing a routine of processing executed in the internal combustion engine system of the embodiment.

FIG. 4 is a flowchart showing a routine of the processing executed in the internal combustion engine system of the embodiment. The routine shown in FIG. 4 is repeatedly executed in the ECU 30 during the operation of the engine 10.

In step S100 of the routine shown in FIG. 4, the intake-air amount Ga is detected by using the air flow meter 16. In a case where the processing of step S100 is completed, the processing proceeds to step S102. In step S102, the engine rotation speed NE is detected by using the rotation speed sensor 36, and the engine load KL is detected from the intake-air amount Ga and the engine rotation speed NE. In a case where the processing of step S102 is completed, the processing proceeds to step S104.

In step S104, the parameter calculation processing is executed in the parameter calculation processing unit 316, and the gas impingement parameter is calculated. Here, the gas impingement parameter corresponding to the engine rotation speed NE and the engine load KL detected in step S102 is calculated from the parameter calculation map. In a case where the processing of step S104 is completed, the processing proceeds to step S106.

In step S106, the rich determination value and the lean determination value are calculated. Here, the rich determination value and the lean determination value corresponding to the gas impingement parameter calculated in step S104 are calculated by using the map shown in FIG. 3. In a case where the processing of step S106 is completed, the processing of the present routine is ended.

Figure 5:
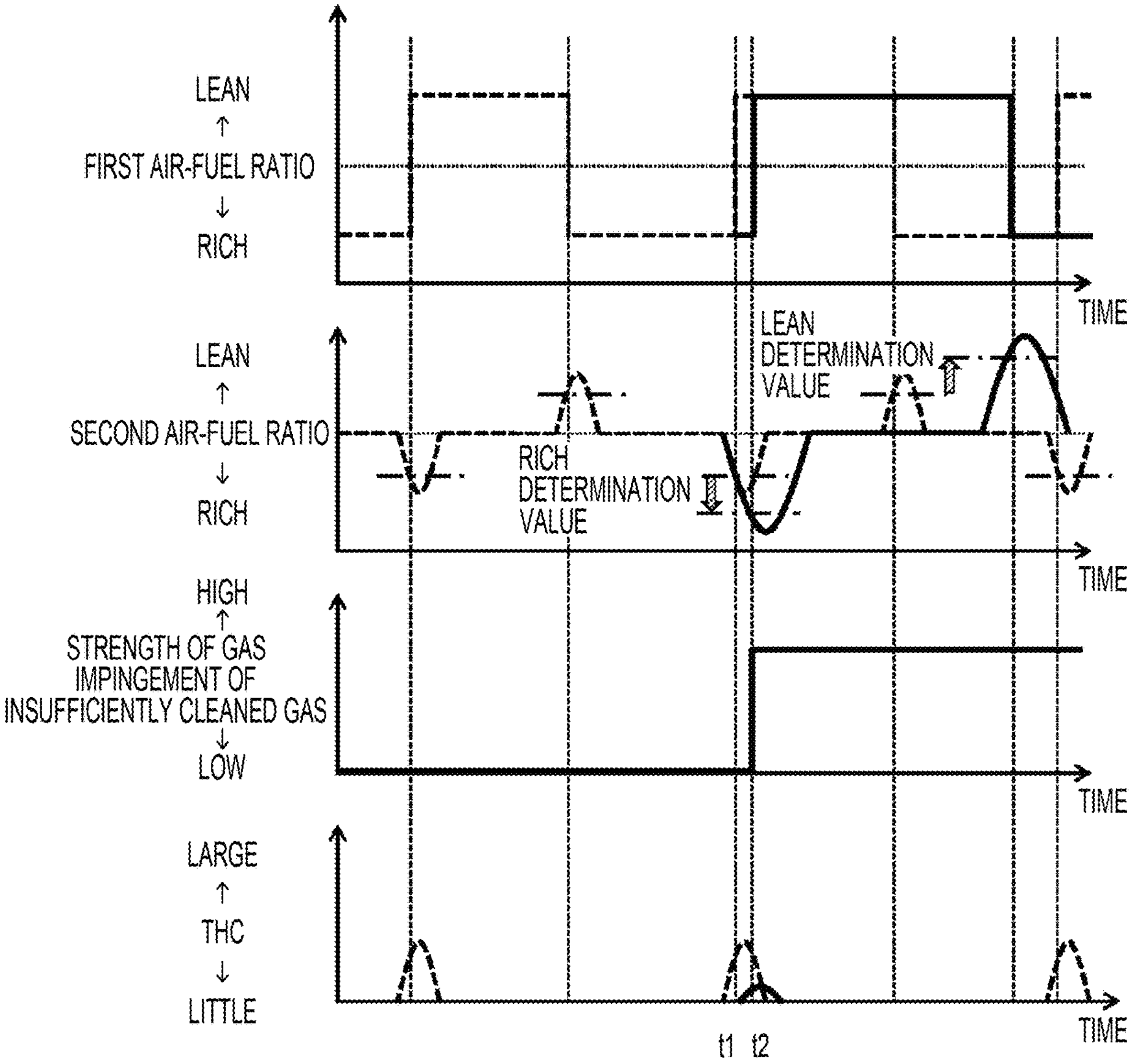
FIG. 5 is a time chart showing changes in various states in a case where switching cycle change processing is executed by the internal combustion engine system of the embodiment.

5. Operations and Effects of Processing Executed by Internal Combustion Engine System of Embodiment The internal combustion engine system 100 of the embodiment exhibits the following operations and effects. FIG. 5 is a time chart showing changes in various states in a case where the switching cycle change processing is executed by the internal combustion engine system of the embodiment. In FIG. 5, a solid line shows an operation example of the internal combustion engine system 100 of an embodiment in which the switching cycle change processing is executed, and a chain line shows an operation example of an internal combustion engine system of a comparative example in which the switching cycle change processing is not executed.

Figure 6A:
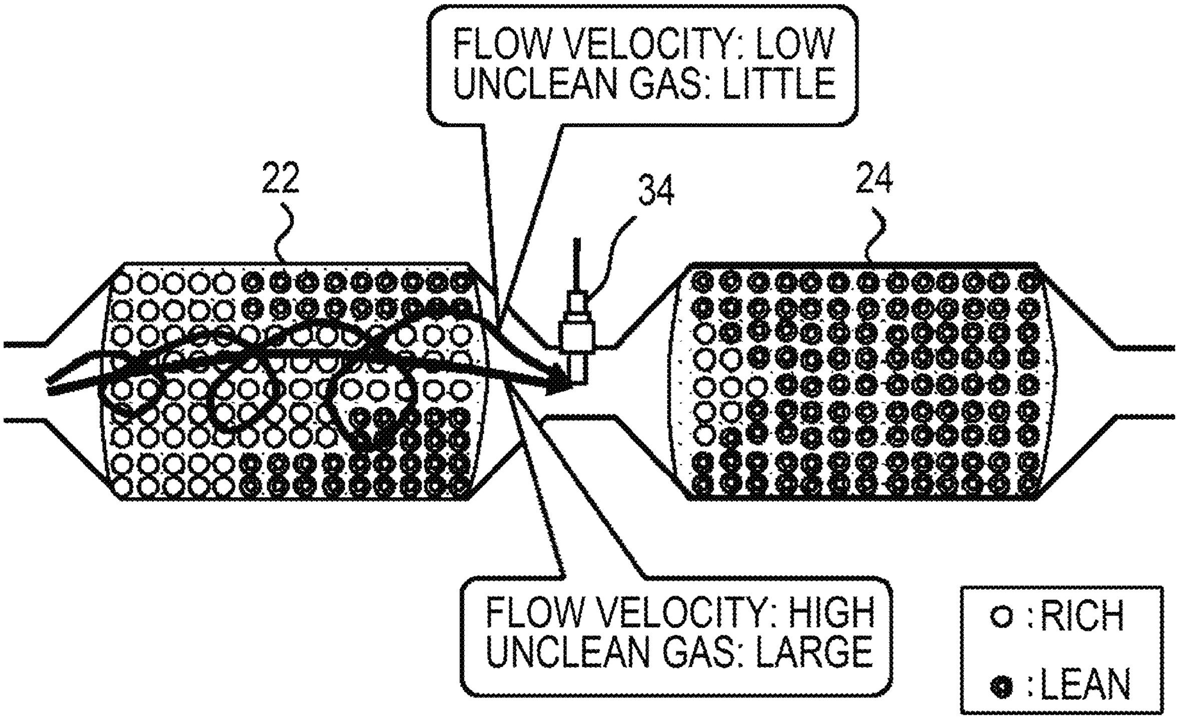
FIG. 6A is an example of a diagram schematically showing an exhaust gas flow and an internal state of an exhaust gas cleaning catalyst.
Figure 6B:
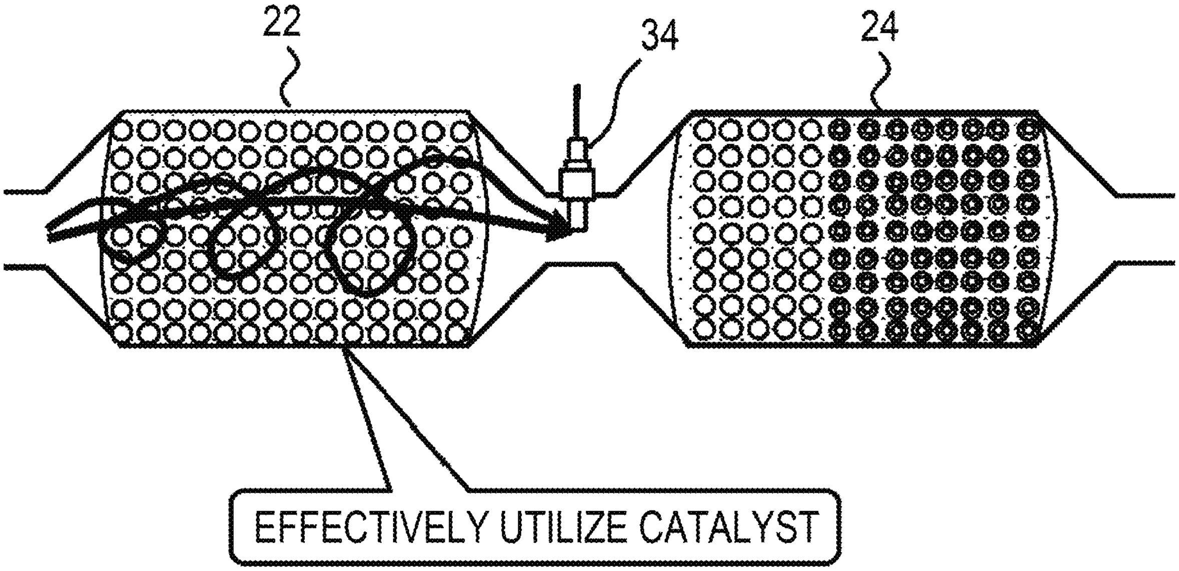
FIG. 6B is another example of a diagram schematically showing the exhaust gas flow and the internal state of the exhaust gas cleaning catalyst.

FIGS. 6A and 6B are diagrams schematically showing an exhaust gas flow and an internal state of an exhaust gas cleaning catalyst. FIG. 6A shows a state at time t1 in the internal combustion engine system of the comparative example of FIG. 5, and FIG. 6B shows a state at time t2 in the internal combustion engine system 100 of the embodiment of FIG. 5. In the internal combustion engine system of the comparative example, as shown in FIG. 6A, the second air-fuel ratio reaches the rich determination value, and thus the target air-fuel ratio is switched to the lean setting value. The second air-fuel ratio is detected by the second air-fuel ratio sensor 34 at a timing of time t1 at which oxygen stored in the first exhaust gas cleaning catalyst 22 remains due to the high degree of gas impingement of the insufficiently cleaned unclean gas. Therefore, in the internal combustion engine system of the comparative example, the first exhaust gas cleaning catalyst 22 and the second exhaust gas cleaning catalyst 24 cannot be maximally effectively utilized, and insufficiently cleaned gas such as HC flows out downstream in the flow direction of the second exhaust gas cleaning catalyst 24.

On the other hand, in the internal combustion engine system 100 of the embodiment, the switching cycle change processing is executed in response to the high degree of gas impingement of the insufficiently cleaned exhaust gas, and the rich determination value is changed to the value farther from the stoichiometric air-fuel ratio. Accordingly, as shown in FIG. 6B, the second air-fuel ratio detected by the second air-fuel ratio sensor 34 at the timing of time t2 after the oxygen stored in the first exhaust gas cleaning catalyst 22 is effectively utilized reaches the rich determination value. Accordingly, the target air-fuel ratio is switched to the lean setting value. Therefore, in the internal combustion engine system 100 of the embodiment, the first exhaust gas cleaning catalyst 22 and the second exhaust gas cleaning catalyst 24 can be effectively utilized. Accordingly, the amount of the insufficiently cleaned gas such as HC flowing out downstream in the flow direction of the second exhaust gas cleaning catalyst 24 can be reduced as compared to that of the comparative example.

6. Modification of Internal Combustion Engine System of Embodiment

The internal combustion engine system 100 of the embodiment may adopt Modification described below.

6-1. Switching Cycle Change Processing

In the switching cycle change processing, a unit that lengthens the switching cycle of the target air-fuel ratio in the target air-fuel ratio switching processing is not limited to a unit that changes the rich determination value and the lean determination value used in the target air-fuel ratio switching processing. That is, in the switching cycle change processing, the switching cycle change processing unit 314 sets a delay time from a point at which the second air-fuel ratio reaches the rich determination value or the lean determination value to a point at which the target air-fuel ratio is actually switched. The switching cycle change processing unit 314 may perform processing to set the delay time to a longer time as the gas impingement parameter is a value indicating that the degree of gas impingement is high.

6-2. Parameter Calculation Processing

In an internal combustion engine with a turbocharger including a wastegate port and a wastegate valve that opens and closes the wastegate port, a flow velocity of gas passing through the wastegate port is higher than a flow velocity of gas passing through a turbine. Therefore, in a case where the engine operating condition changes and a ratio between the gas passing through the turbine and the gas passing through the wastegate port changes, a degree to which the gas passing through the wastegate port impinges the second air-fuel ratio sensor 34 also changes.

Therefore, in a case where the engine 10 is an internal combustion engine with a turbocharger including the wastegate port and the wastegate valve, the parameter calculation processing unit 316 may reflect a state of the wastegate valve in the calculation of the gas impingement parameter in addition to the engine rotation speed NE and the engine load KL in the parameter calculation processing. In this case, the ECU 30 may store the parameter calculation map in which a relationship between the engine rotation speed NE, the engine load KL, and an opening degree of the wastegate valve and the gas impingement parameter is defined in the ROM.

6-3. Target Air-Fuel Ratio Switching Processing

In the target air-fuel ratio switching processing, the target air-fuel ratio switching processing unit 312 may set the lean setting value and the rich setting value to values closer to the stoichiometric air-fuel ratio than before occurrence of the predetermined increase pattern in a case where the predetermined increase pattern occurs in a change in the intake-air amount Ga. Here, an example of the predetermined increase pattern is a case where the intake-air amount Ga exceeds a predetermined value. In this manner, in a case where the intake-air amount Ga increases, the lean setting value and the rich setting value are set to values closer to the stoichiometric air-fuel ratio than before the increase of the intake-air amount Ga. Accordingly, it is possible to suppress outflow of the unclean gas downstream in the flow direction of the exhaust gas cleaning catalyst under a condition in which the flow velocity of the exhaust gas is high.

What is claimed is:

1. An internal combustion engine system comprising:

a first exhaust gas cleaning catalyst disposed in an exhaust passage of an internal combustion engine;

a second exhaust gas cleaning catalyst disposed downstream of the first exhaust gas cleaning catalyst in an exhaust gas flow direction;

a first air-fuel ratio sensor disposed upstream of the first exhaust gas cleaning catalyst in the exhaust gas flow direction in the exhaust passage;

a second air-fuel ratio sensor disposed downstream of the first exhaust gas cleaning catalyst in the exhaust gas flow direction and upstream of the second exhaust gas cleaning catalyst in the exhaust gas flow direction in the exhaust passage; and a control device configured to control the internal combustion engine, wherein the control device is configured to execute feedback processing of performing feedback control of an air-fuel ratio of exhaust gas exhausted from the internal combustion engine such that a first air-fuel ratio detected by the first air-fuel ratio sensor reaches a target air-fuel ratio, target air-fuel ratio switching processing of alternately switching the target air-fuel ratio between a lean setting value leaner than a stoichiometric air-fuel ratio and a rich setting value richer than the stoichiometric air-fuel ratio, parameter calculation processing of calculating, based on an operating condition of the internal combustion engine, a gas impingement parameter indicating a degree of gas impingement to which unclean gas in the exhaust gas exhausted from the first exhaust gas cleaning catalyst impinges on the second air-fuel ratio sensor, and switching cycle change processing of lengthening a switching cycle of the target air-fuel ratio in the target air-fuel ratio switching processing as the gas impingement parameter is a value indicating that the degree of gas impingement is high.

2. The internal combustion engine system according to claim 1, wherein:

in the target air-fuel ratio switching processing, the control device is configured to set the target air-fuel ratio to the lean setting value when a second air-fuel ratio detected by the second air-fuel ratio sensor is equal to or less than a rich determination value richer than the stoichiometric air-fuel ratio, and set the target air-fuel ratio to the rich setting value when the second air-fuel ratio is equal to or more than a lean determination value leaner than the stoichiometric air-fuel ratio; and in the switching cycle change processing, the control device is configured to set the lean determination value and the rich determination value to values farther from the stoichiometric air-fuel ratio as the gas impingement parameter is the value indicating that the degree of gas impingement is high.

3. The internal combustion engine system according to claim 2, wherein in the target air-fuel ratio switching processing, the control device is configured to, when an increase pattern that is predetermined occurs in a change in an intake-air amount of the internal combustion engine, set the lean setting value and the rich setting value to values closer to the stoichiometric air-fuel ratio than before the increase pattern occurs.

4. The internal combustion engine system according to claim 1, wherein:

the internal combustion engine is an internal combustion engine with a turbocharger including a wastegate port and a wastegate valve that opens and closes the wastegate port; and in the parameter calculation processing, the control device is configured to calculate the gas impingement parameter based on a rotation speed and an intake-air amount of the internal combustion engine and an opening degree of the wastegate valve.

* * * * *